United States Patent [19]
Zuidema

[11] Patent Number: 5,478,186
[45] Date of Patent: Dec. 26, 1995

[54] DEVICE FOR COLLECTING WASTE, IN PARTICULAR WASTE PACKING GLASS

[75] Inventor: Roelof Zuidema, Hoogeveen, Netherlands

[73] Assignee: Zuidema Milieu B.V., Netherlands

[21] Appl. No.: 244,878

[22] PCT Filed: Dec. 16, 1992

[86] PCT No.: PCT/NL92/00228

§ 371 Date: Jun. 16, 1994

§ 102(e) Date: Jun. 16, 1994

[87] PCT Pub. No.: WO93/12018

PCT Pub. Date: Jun. 24, 1993

[30] Foreign Application Priority Data

Dec. 17, 1991 [NL] Netherlands ............... 9102109

[51] Int. Cl.⁶ ................................ B65D 88/58
[52] U.S. Cl. ............ 414/404; 220/909; 294/68.25
[58] Field of Search .................. 414/406, 407, 414/408, 409, 410, 486, 487, 404; 294/68.21, 68.25; 220/909

[56] References Cited

U.S. PATENT DOCUMENTS

| | | | |
|---|---|---|---|
| 2,837,369 | 6/1958 | Stopps | 294/68.25 |
| 4,113,125 | 9/1978 | Schiller | 220/909 X |
| 4,450,828 | 5/1984 | Onken et al. | 414/409 X |
| 4,960,220 | 10/1990 | Foa | 220/909 X |
| 5,018,929 | 5/1991 | Carson | 414/408 |
| 5,035,563 | 7/1991 | Mezey | 414/409 |
| 5,035,564 | 7/1991 | Matsumoto | 414/409 |
| 5,116,184 | 5/1992 | Pellegrini | 220/909 X |
| 5,228,591 | 7/1993 | Jones | 220/909 X |
| 5,244,218 | 9/1993 | Irwin, Sr. | 220/909 X |

FOREIGN PATENT DOCUMENTS

| | | | |
|---|---|---|---|
| 2228183 | 6/1984 | Australia . | |
| 0045930 | 2/1982 | European Pat. Off. . | |
| 0166072 | 1/1986 | European Pat. Off. . | |
| 0356833 | 3/1990 | European Pat. Off. . | |
| 2576852 | 8/1986 | France | 414/409 |
| 0091387 | 4/1897 | Germany | 414/410 |

Primary Examiner—Michael S. Huppert
Assistant Examiner—James W. Keenan
Attorney, Agent, or Firm—Mark Zovko

[57] ABSTRACT

A device for collecting waste, in particular waste packing glass. At least one intake container and one collecting container is provided. The intake container has a lifting device for raising the intake container above the collecting container. The intake container has a bottom part and bottomless housing which is movable relative to the bottom part so that an open and closed position can be defined. In the closed position, a lower edge of the housing part lies against the bottom forming a seal and in the open position the lower edge of the housing is situated at a distance from the bottom part allowing discharge of the contents. The intake and collecting container can be aligned prior to discharge, thereby assuring error-free emptying of the intake container.

6 Claims, 4 Drawing Sheets

5,478,186

DEVICE FOR COLLECTING WASTE, IN PARTICULAR WASTE PACKING GLASS

FIELD OF THE INVENTION

The invention relates to a device for collecting waste, comprising at least one intake container having a bottom part and a bottomless housing part fitting thereon and provided with waste intake openings that is movable relative to the bottom part between a closed position in which a lower edge of the housing part lies sealingly against the bottom and an open position in which the lower edge is situated at a distance from the bottom part, first engaging means for first lifting means being connected to the bottom part and second engaging means for second lifting means being connected to the housing part.

DESCRIPTION OF THE PRIOR ART

Such a device is known from AU-B-22 281/83. In the present day trend of separated collection of different kinds of waste material, on each collecting point a number of intake containers are positioned, each for a different kind of waste material. Each of these containers has to be emptied separately, so as to avoid mixing of the separated waste materials. Furthermore, the separate intake containers take up a lot of space and for the persons discarding the waste materials it is cumbersome to walk back and forth between the different containers for getting rid of their waste materials, and this is not inducive for stimulating the desired separate collection of the waste.

SUMMARY OF THE INVENTION

The invention has for its object to provide a device of the kind set forth above with which these disadvantages are eliminated.

This object is achieved with the device according to the invention. Different sorts of waste can now be collected in the different compartments of one and the same intake container. Particularly, when used for waste packing glass, a separate compartment can be formed for each type of glass, in particular for each colour. During emptying the different compartments are positioned by the aligning means above the different compartments of the collecting container, so that the different types of waste, in particular different types of glass, also fall into the separate compartments of the collecting container.

The intake container can be positioned at a random location in lengthwise direction of the rails so that the collecting container can be evenly filled. The rails simultaneously form the aligning means.

The waste thrown into the intake container falls entirely and without leaving remnants into the collecting container during emptying.

The housing part is well positioned relative to the bottom part when the intake container is re-closed. The reliable closing of the intake container does not hereby depend on any special vigilance on the part of the operative.

The rod-like lifting member is pushed downward in the situation where the intake container is arranged standing outside. When the container is raised the rod-like lifting member slides out so that space is created for the housing part to move upward relative to the bottom part.

The invention likewise relates to and provides an intake container and a collecting container intended for a device according to the invention.

BRIEF DESCRIPTION OF THE DRAWINGS

The invention will be further elucidated in the following description of an embodiment shown in the figures.

DESCRIPTION OF THE PREFERRED EMBODIMENTS

Figure 1:
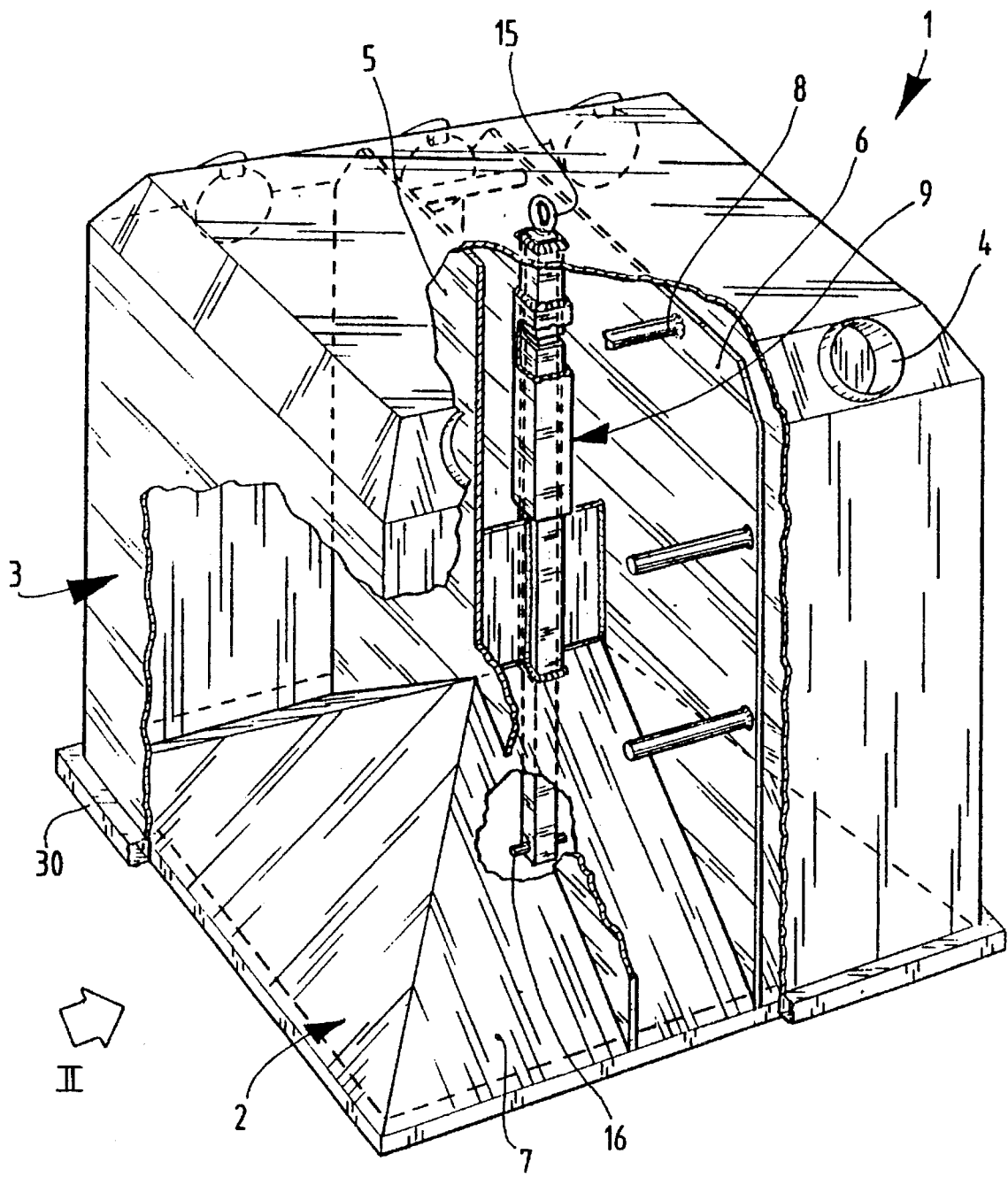
FIG. 1 shows a partly broken away perspective view of an intake container according to a preferred embodiment of the device.

The intake container 1 comprises a bottom part 2 and a housing part 3 fitting thereon. The bottom 7 of the bottom part 2 is substantially pyramid-shaped. The bottom part 2 comprises in this embodiment two vertical transverse walls 5, 6 which divide the interior space of the intake container 1 into three compartments. Each of these compartments is provided with two intake openings 4. The intake container 1 shown in FIG. 1 is particularly intended for collecting waste packing glass. To enable re-use of this waste glass it is desirable to collect the different types separately, in particular glass of different colours. The three compartments of the intake container 1 are therefore intended respectively for white, green and brown glass. Suitable indications on the outside of the housing part make it clear to the user which sort of glass can be placed into which of the intake openings 4.

The transverse walls 5, 6 are arranged in a position such that the volumes of the thereby defined compartments are such that these are mutually in proportion in accordance with the ratio in which the different glass types usually occur in the waste glass.

A number of connecting strengthening members 8 are arranged between transverse walls 5 and 6.

Figure 2:
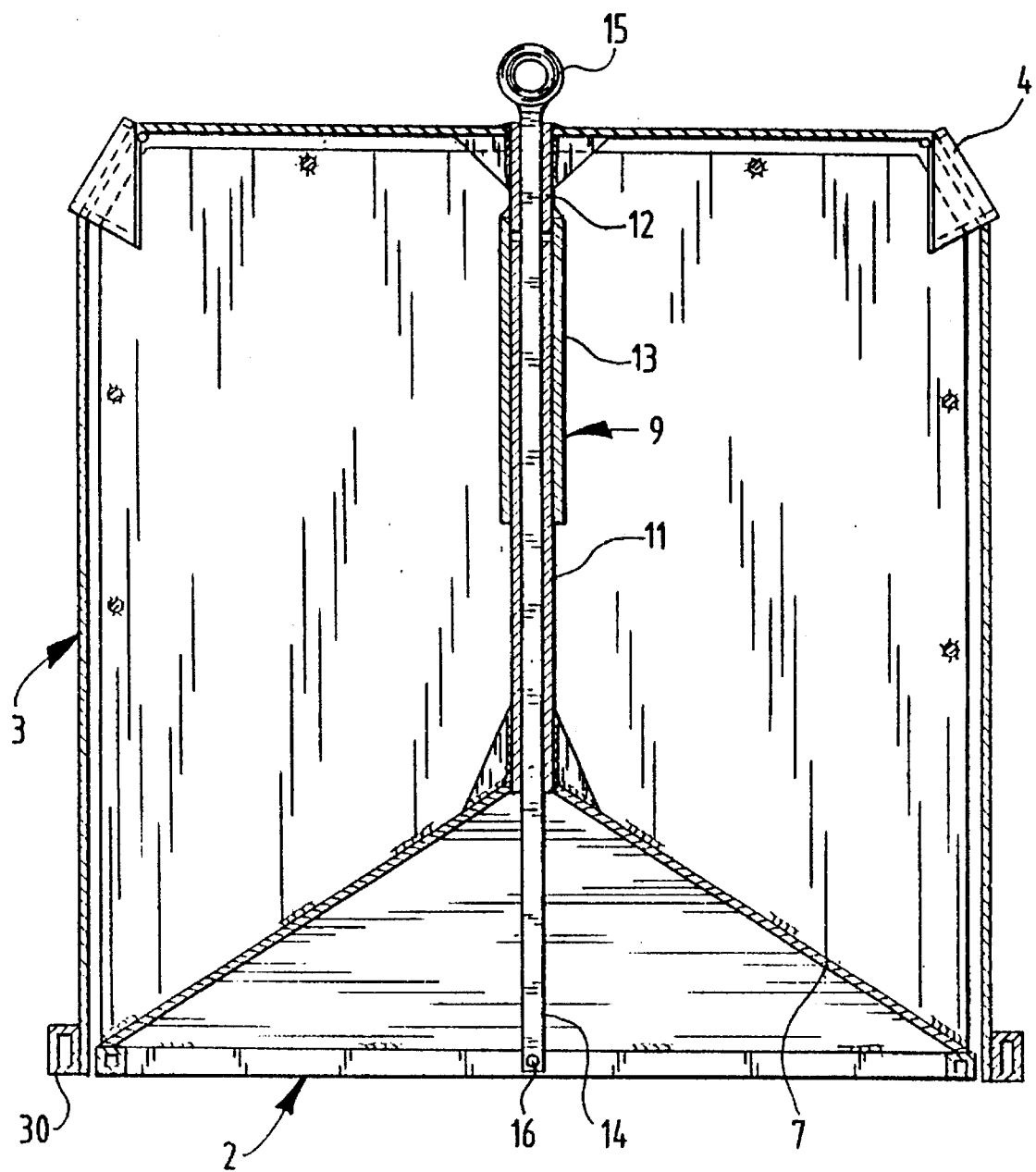
FIG. 2 shows a sectional side view in the direction of arrow II of FIG. 1.

The housing part 3 can move vertically relative to the bottom part 2. A slide guide 9, which is shown more clearly in FIG. 2, is arranged for good guiding of the two parts 2 and 3 relative to each other. This slide guide 9 comprises a tube portion 11 fixedly connected to the bottom part and in line therewith a tube portion 12 connected to the housing part 3. Fixedly welded to tube portion 12 is a tube portion 13 which has a slightly larger size and which falls slidably over tube portion 11. The tube portions 11, 12 and 13 are square tube portions so that a substantially non-rotatable slide guide is obtained.

Figure 3:
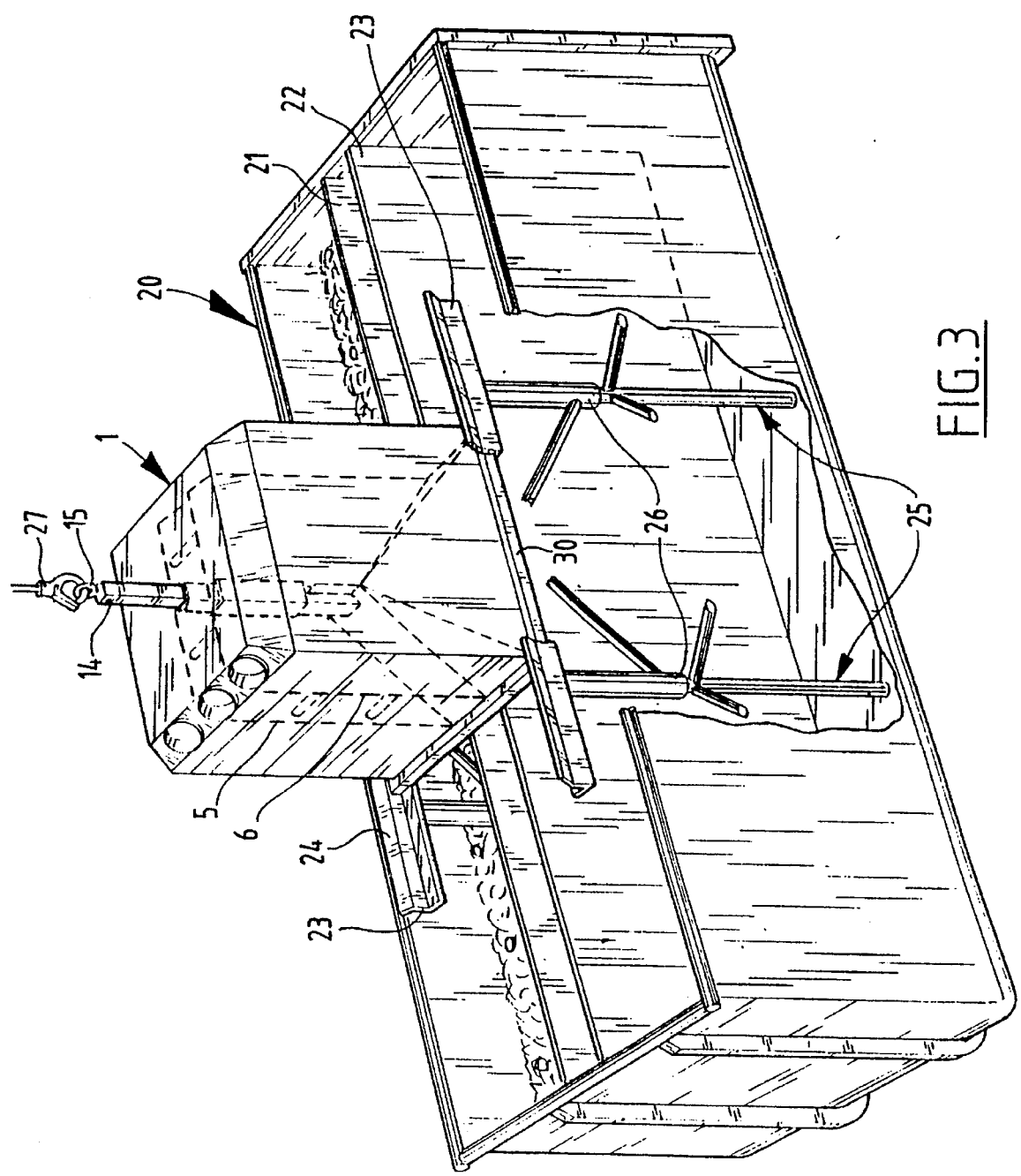
FIG. 3 shows the intake container of the preceding figures placed on a collecting container of the device.

A lift rod 14 extends through the slide guide 9, that is, through tube portions 11 and 12. This lift rod has a length approximately equal to the height of the housing part 3 so that a lifting eye 15 arranged at the top end of the lift rod 14 normally lies closely against the upper surface of the container. At the bottom end the lift rod 14 is provided with a stop pin 16 which, when the lift rod 14 is moved upward, comes into engagement with the lower surface of the bottom 7. When the intake container 1 is thus raised, for example by hooking a lifting hook 27 into the lift eye 15 as shown in FIG. 3, the lift rod will first slide out until the stop pin 16 comes into contact with the bottom 7. With further lifting the bottom part 2 is thereby also raised and, because the housing part 3 lies on the bottom part 2 and in particular because the tube portion 12 lies on the tube portion 11, the whole container 1 can be raised.

Figure 4:
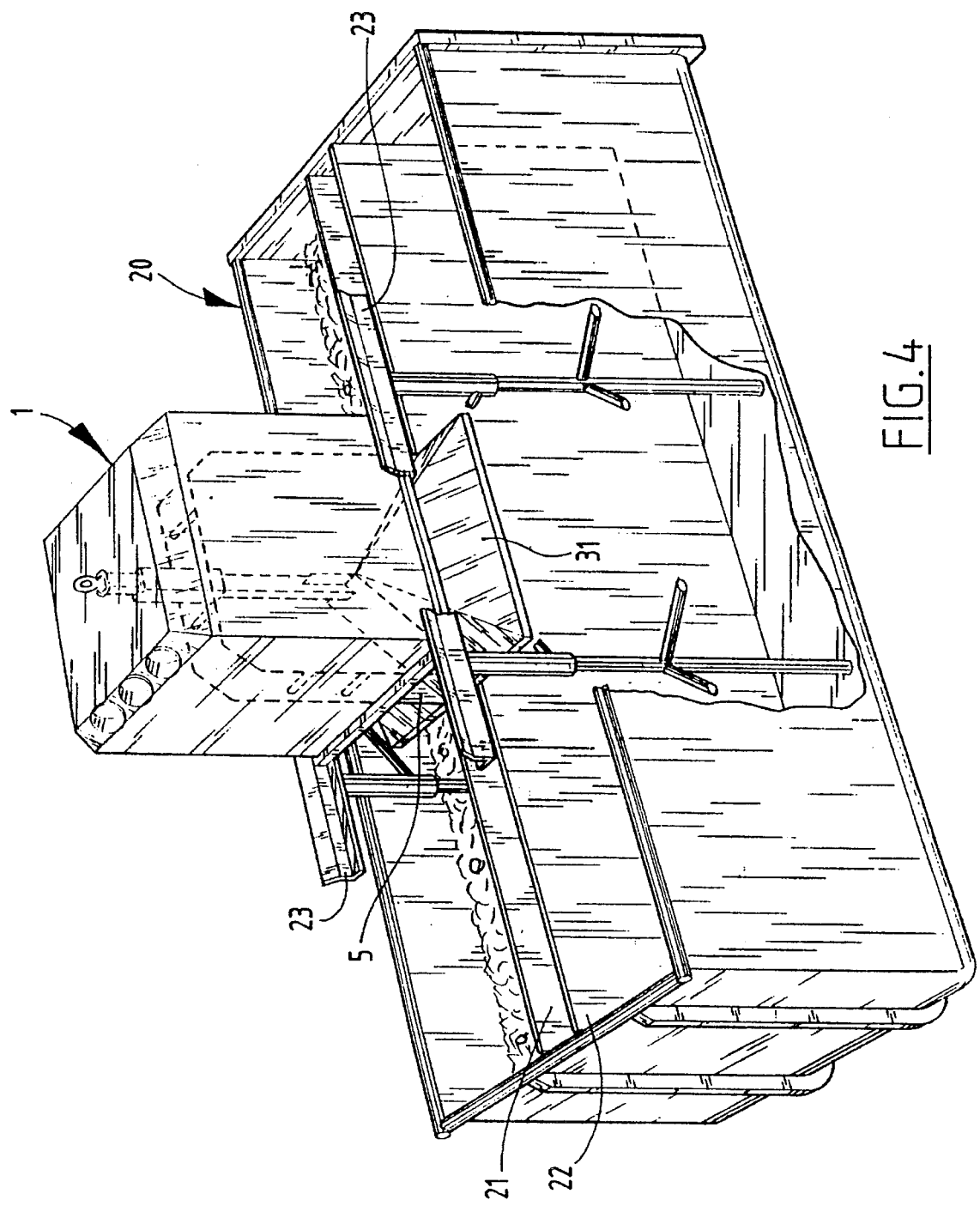
FIG. 4 shows a view corresponding with FIG. 3 wherein the housing part of the intake container is raised for emptying this container.

In addition to the at least one intake container 1 as shown in FIGS. 1 and 2 the device according to the invention comprises a collecting container, an example 20 of which is shown in FIGS. 3 and 4. The collecting container 20 can be mounted on a truck and can be driven in the usual manner to a number of intake containers arranged distributed in a collection area in order to empty them at their location.

In that case the truck is likewise provided for the emptying with the lifting device also forming part of the device according to the invention.

As shown particularly in FIG. 3, the collecting container 20 is also provided with transverse walls 21, 22 which correspond to the transverse walls 5 and 6 in an intake container 1.

According to the invention the collecting container 20 is provided with a lifting device with which the housing part 3 of the intake container can be lifted relative to the bottom part 2. In the embodiment shown the lifting device is formed by two rails 23 disposed at a mutual distance parallel to each other and to the transverse walls 21, 22, which rails are supported by hydraulic jacks 25 arranged in the collecting container 20. As is shown, the embodiment is such that each rail 23 is supported by two jacks 25. The cylinders 26 of jacks 25 are connected to the rail 23. By feeding hydraulic oil under pressure to the cylinders 26 in the usual manner the rail 23 can thus be moved upward. The jacks 25 of the two rails are provided via a per se known hydraulic tracking circuit with hydraulic oil under pressure so that the rails 23 can move synchronously up and downward on either side.

The rails 23 are formed in the embodiment by angle profiles with mutually facing legs. On the top side of the upward protruding leg of the angle profile is arranged a slanting guide surface which facilitates positioning of the container 1 on the rails 23. The rails 23 are arranged at a mutual distance such that the mutually facing horizontal flanges thereof engage precisely under edge profiles 30 of the intake container. The bottom part 2 however remains free of the rails 23.

Emptying of the intake container proceeds as follows: Using the lifting device the intake container 1 is positioned above the collecting container 20 such that the said edge profiles 30 comes to lie in rails 23. From that moment the lifting device can remain in engagement or can be wholly released, so that the bottom part comes to rest on the transverse walls 21, 22. In any case, for the purpose of emptying the intake container 1, the jacks 25 are then activated, whereby the rails 23 move upward and the housing part 3 of container 1 is moved upward relative to the bottom part 2. Thus created between the lower edge of the bottom part 2 and the lower edge of the housing part 3 are openings 31, through which waste thrown into the compartments of the container 1 can flow into the corresponding compartments in the collecting container 20.

The rails 23 form aligning means which determine the position of the intake container i transversely of the transverse walls 21, 22. The transverse walls 5, 6 of the intake container 1 are thereby positioned substantially in the same plane as transverse walls 21, 22 of collecting container 20. The compartments of container 1 thus empty into the separate compartments of the collecting container 20.

Once all the waste, in particular waste glass, has flowed out of the container 1 the hydraulic jacks 25 are again retracted and the lifting device activated whereby the intake container is lifted from the rails 23 and can be replaced in its set position.

As shown, the rails 23 have a greater length than the intake container 1 so that the intake container can be placed in different positions on the rails 23 in lengthwise direction of the collecting container 20. This enables even filling of the container 20.

The collecting container 20 is further provided in the usual manner with discharge doors (not shown), via which the different compartments can be separately emptied.

I claim:

1. Device for collecting waste, comprising at least one intake container (1) having a bottom part (2) and a bottomless housing part (3) fitting thereon and provided with waste intake openings (4) that is movable relative to the bottom part (2) between a closed position in which a lower edge of the housing part (3) lies sealingly against the bottom part (2) and an open position in which the lower edge of the housing part is situated at a distance from the bottom part (2), first engaging means (15) for first lifting means being connected to the bottom part (2) and second engaging means (30) for second lifting means (25) being connected to the housing part (3), characterized in that the bottom part (2) comprises at least one first vertical transverse wall (5,6) lying sealingly against the walls of the housing part (3) and dividing the intake container (1) into compartments each provided with its own intake openings (4), in that the device further comprises a collecting container (20) provided with a number of second transverse walls (21,22) and having aligning means (23) for positioning the intake container (1) relative to the collecting container (20) such that the at least one first tranverse wall (5,6) thereof lies substantially in the same plane as one of the second transverse walls (21,22) of the collecting container (20), said aligning means (23) comprising guide surfaces which facilitate positioning of the intake container (1) thereon and support surfaces for supporting said intake container.

2. Device as claimed in claim 1, wherein the aligning means further comprises two rails (23) which are disposed at a distance parallel to each other and to the transverse walls (21,22) of the collecting container, each of which can be moved upward by the second lifting means formed by a number of hydraulic cylinders (25) and wherein the second engaging means of each intake container (1) comprises, on two opposite sides, along the lower edge thereof, parts (30) protruding outside the bottom part (2) and co-acting with the rails (23).

3. Device as claimed in claim 2, wherein the rails (23) are formed by angle irons each having a leg directed towards the other angle iron.

4. Device as claimed in claim 1, wherein the intake container (1) has internally an approximately pyramid-shaped bottom (7).

5. Device as claimed in claim 1, wherein the housing part (3) of the intake container (1) is movably connected to the bottom part (2) by a vertical slide guide (9).

6. Device as claimed in claim 5, wherein the first engaging member is a rod-like member extending slidably over a distance through the slide guide (9) and protruding above the housing part and provided at its bottom end with a stop (16) which in an extended position of thread-like member engages the bottom part (2).

* * * * *